J. G. PERKINS.

FLUSHING VALVE.

APPLICATION FILED APR. 17, 1915.

Reissued Feb. 15, 1916.

14,067.

2 SHEETS—SHEET 1.

Witnesses:

Arthur M. Carlson

H. A. Reiburger

Inventor

Joseph G. Perkins

By Williamson & Bradbury

Attys.

THE COLUMBIA PLANOGRAPH CO., WASHINGTON, D. C.

J. G. PERKINS.

FLUSHING VALVE.

APPLICATION FILED APR. 17, 1915.

Reissued Feb. 15, 1916.

14,067.

2 SHEETS—SHEET 2.

Witnesses:
Arthur H. Carlson
H. A. Neiburger

Inventor
Joseph G. Perkins
By Williams & Bradbury
Attys.

THE COLUMBIA PLANOGRAPH CO., WASHINGTON, D. C.

UNITED STATES PATENT OFFICE.

JOSEPH G. PERKINS, OF CINCINNATI, OHIO, ASSIGNOR, BY MESNE ASSIGNMENTS, TO PERKINS-SKINNER VALVE CO., A CORPORATION OF ILLINOIS.

FLUSHING-VALVE.

14,067. Specification of Reissued Letters Patent. Reissued Feb. 15, 1916.

Original No. 1,118,440, dated November 24, 1914, Serial No. 818,650. Application for reissue filed April 17, 1915. Serial No. 22,210.

*To all whom it may concern:*

Be it known that I, JOSEPH G. PERKINS, a citizen of the United States, residing at Cincinnati, in the county of Hamilton and State of Ohio, have invented certain new and useful Improvements in Flushing-Valves, of which the following is a specification.

My invention relates to improvements in flushing valves for water-closets, urinals, and for similar purposes.

One of its objects is to provide a reliable and efficient flushing valve to be connected directly to the water supply pipe and not requiring a flushing tank.

Another object is to provide a flushing valve reliably operable irrespective of variations in the water supply pressure.

Another object is to provide a flushing valve of simple construction and long life and avoiding the use of rubber or similar materials which are necessarily of short life, and in which the parts, if necessary, can be readily and quickly replaced.

Another object is to provide a flushing valve capable of operating with a water supply of low pressure, and also capable of withstanding and operating with a water supply of high pressure.

Another object is to provide a practically noiseless flushing valve.

Figure 1:
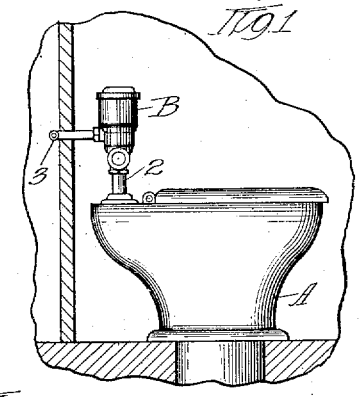
Figure 4:
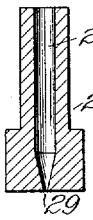
Figure 5:
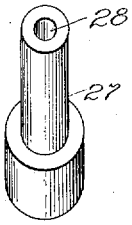
Figure 2:
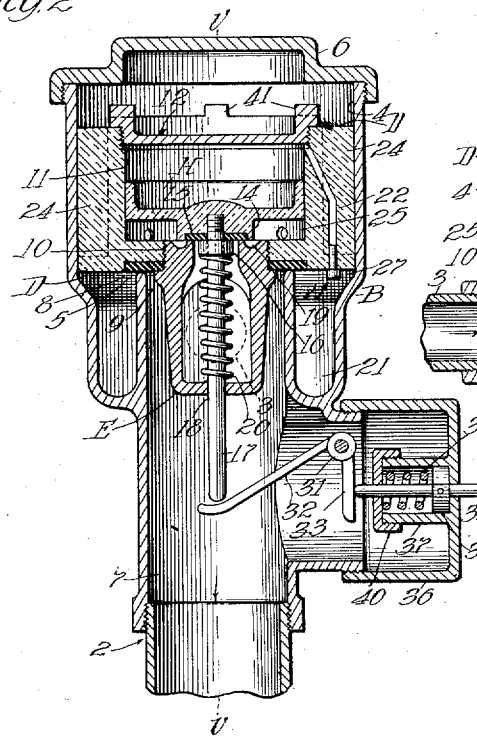
Figure 3:
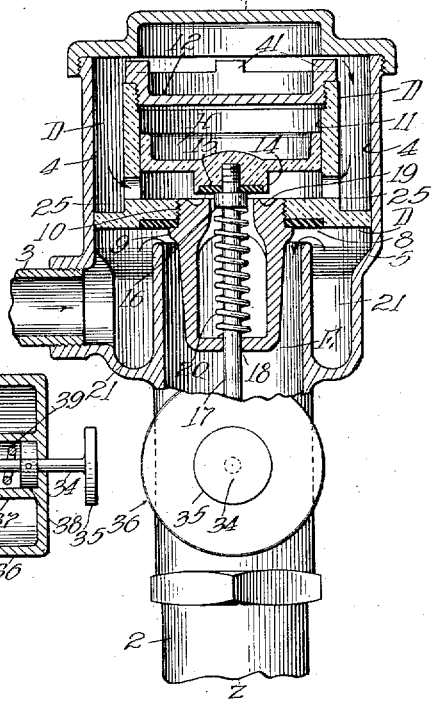
Figure 6:
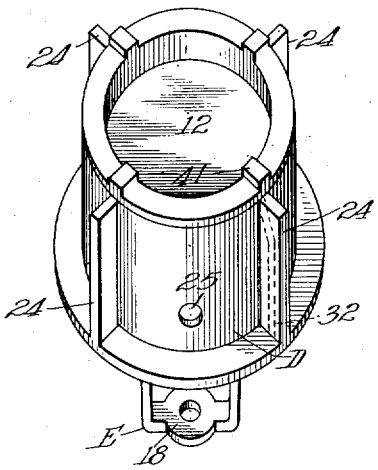
Figure 7:
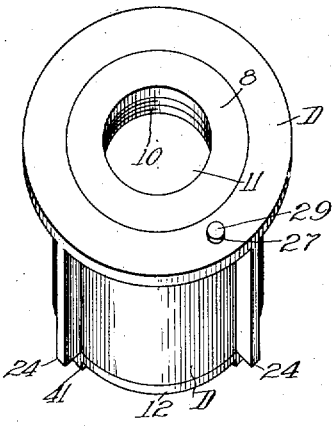
Figure 8:
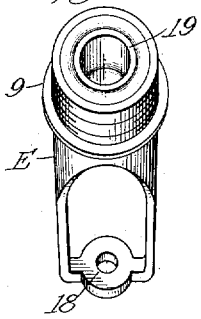
Figure 9:
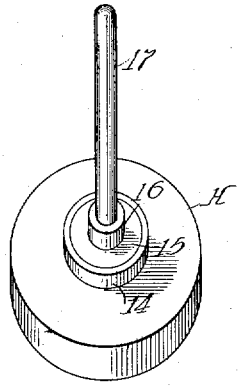

My invention also comprises certain details of form, combination, and arrangement, all of which will be fully set forth in the description of the accompanying drawings, in which:—Figure 1 is a side elevation of a toilet with my improved valve mechanism in position for use. Fig. 2 is a central vertical section through the valve on line *z—z* of Fig. 3 with the valve in normal or rest position. Fig. 3 is a central vertical section on line *v—v* of Fig. 2 with the valve in position to flush. Fig. 4 is an enlarged central vertical section through the bypass plug. Fig. 5 is a perspective view of the same. Fig. 6 is a perspective view of the main valve detached. Fig. 7 is a perspective view of the same inverted and with the auxiliary valve cage detached. Fig. 8 is a perspective view of the auxiliary valve seat and cage. Fig. 9 is a perspective view of the auxiliary valve and piston.

The accompanying drawings illustrate the preferred embodiment of my invention, in which A represents a toilet or article to be flushed, B represents the shell or casing of the valve connected by a pipe 2 with the toilet and supplied with water under pressure through a water supply pipe 3.

The casing B is provided with a cylindrical valve chamber 4, a valve seat 5, a closing cap 6, and an exit port 7 to which the pipe 2 is connected.

The main valve D constitutes a plunger loosely fitting the walls of the chamber 4 and normally resting by gravity upon the upper end of the tubular valve seat 5. When water under pressure is admitted to the valve casing a portion of the water finds its way between the exterior of the valve D and the walls of chamber 4, and exerts a downward pressure on valve D tending to hold said valve upon the seat 5. The lower face of valve D is recessed to receive a detachable valve disk or washer 8 preferably of fiber composition or soft metal. The disk or valve seat 8 is held in place by means of a flange 9 on an auxiliary valve cage E which is threaded into a central recess 10 in valve D, and from which said valve cage E depends into the tubular valve seat 5. The upper portion of the valve D is hollowed out to form a cylindrical chamber 11 which is closed at the upper end by a cap 12 threaded thereto. Within the chamber 11 is a freely moving plunger H having a central downward projection 14 the lower face of which is recessed to receive a detachable disk or valve seat 15, preferably of the same material as the disk 8. The disk 15 is held in place by means of a collar 16 on the valve stem 17. The valve stem 17 is threaded into the plunger H and at its lower end passes through a perforation 18 in the cage E, which assists in guiding and holding said stem in a central vertical position.

The cage E is provided with an annular valve seat 19 on its upper face upon which the disk 15 seats. When not subjected to water pressure a spring 20 on the stem 17 serves to hold the disk 15 slightly off the seat 19, in about the position indicated in Fig. 3. When water pressure is admitted to the chamber 21 around the tubular valve seat 5, a portion of the water finds its way through a by-pass port 22 in the wall of valve D into the chamber 11, thereby forcing the plunger H downwardly and serving to hold the disk 15 in contact with the valve seat 19. Thus when water pressure is admitted to the chamber 21 it finds its way to the upper faces of plungers D and H and closes both the main and auxiliary valves, and holds them in that position until the auxiliary valve is tripped by external force to flush the toilet.

The periphery of the plunger D is preferably recessed, leaving wings or fins 24 to guide it vertically in the chamber 4, and said recesses between the fins 24 are connected by ports 25 with the chamber 11 beneath the plunger H, so that when the auxiliary valve 15 is off its seat the water is drained from the chamber 4 above the plunger D and from the chamber 11 below the plunger H through the auxiliary valve to the exit 7. This in turn permits the plunger D to be automatically lifted off its seat 5 by pressure of water from chamber 21, and thereby permitting a large volume of water to flow from chamber 21 over the valve seat 5 and down the exit 7 to flush the toilet. At the same time there is a restricted flow of water from chamber 21 through the by-pass 22 to the chamber 11 above the plunger H, which slowly forces the plunger H downwardly until the disk 15 seats upon the valve seat 19, preventing further escape of water from the upper portion of chamber 4, whereupon the restored water pressure against the upper face of plunger D forces plunger D downwardly until the disk 8 closes upon the valve seat 5 and entirely cuts off the flow of water.

The by-pass 22 is preferably bored through one of the fins 24, of plunger D and to conveniently secure an orifice sufficiently restricted to properly time the flushing operation, I preferably provide a detachable plug 27, the barrel of which is forced into the bore of the by-pass 22 with sufficient pressure to retain it in position. The bore 28 of the plug 27 is tapered at one end to a comparatively small orifice 29, the diameter of which as compared with the volume displaced by the upward movement of the plunger H determines the time required to reseat the auxiliary valve and hence the volume of water furnished or passed each time by the valve for flushing purposes. When the plunger H is elevated, a portion of the water above it in chamber 11 is forced downwardly between the plunger H and the walls of the chamber 11, and escape through the auxiliary valve, while another portion is forced from chamber 11 through the by-pass 22 into chamber 21, which reverse current in the by-pass, and particularly in the restricted portion 29 of the bore of plug 27 serves to automatically keep said restricted passage open and free from obstruction. Slight pressures only are required above plunger H to move said plunger downwardly, hence the leakage past said plunger from above is small, and is always less than the amount supplied through the port 22. It will be noted that all the water required in chamber 11 above plunger H to reseat the auxiliary valve is required to reach chamber 11 by way of the by-pass 22, hence due to the relations to each other of said chamber, plunger and by-pass, variations or differences in the pressure of the water supply have practically no effect upon the volume of flushing water supplied by the valve, which is practically uniform irrespective of the supply pressure. Also that the volume of flush water may be varied as desired by replacing the plug 27 with one having a larger or smaller orifice 29.

Any instrumentality may be employed to trip the auxiliary valve when it is desired to flush the toilet, the one illustrated comprising a bell crank lever pivoted at 31 to engage and lift the stem of the auxiliary valve to the casing B, with one arm 32 in position to force said valve off its seat, while the other arm 33 is in position to be acted upon by the endwise thrust of the stem 34 of a push button 35 located outside the casing B. The stem 34 is mounted in a cap 36 threaded to the casing B. Said cap is preferably provided with a chamber 37 to receive a small plunger 38 rigidly pinned or mounted on the stem 34, and serving to prevent leakage around the stem 34. A spring 39 bears against one face of the plunger 38 and is held in place within the barrel or chamber 37 by means of a cap 40, threaded to the inner end of said barrel, said cap also serving as a support and guide for the inner end of the stem 34. When pressure is first exerted to force the auxiliary valve from its seat, the water above plunger H escapes through by-pass 22, but as soon as the auxiliary valve opens sufficiently for water to escape therethrough, pressure above plunger H is quickly relieved by escape between said plunger and the walls of chamber 11, and the pressure above plunger D is also relieved, whereupon the pressure of water from below plunger D forces said plunger quickly upward, until the lugs 41 of the cap 12 strike the inner face of cap 6, which limits the upward movement of plunger D, and gives the main valve full opening, in which position it remains until the auxiliary valve reseats when the main valve quickly closes, due to water pressure above plunger D being restored.

My improved valve is capable of use with hot liquids or those of corrosive nature, as the material and construction are such as not to be materially affected thereby. It may also be employed as a means for measuring liquids.

The mechanism herein illustrated and described is capable of considerable modification without departing from the principle of my invention.

Having described my invention what I claim is:—

1. A flush valve comprising a casing having fluid supply and exit ports and an interposed valve seat, a plunger loosely fitting the interior of said casing and constituting a valve to engage said valve seat, said plunger having a portion of one surface and a relatively greater area of its opposite surface exposed to the fluid pressure within said casing to normally hold said plunger in engagement with its valve seat, and to cause said valve to automatically open when said fluid pressure is released from said greater pressure area, an auxiliary valve chamber, an exit port with a valve seat through the wall of said chamber, an auxiliary plunger loosely fitting the interior of said auxiliary valve chamber and constituting a valve to engage said auxiliary valve seat, a port leading from the exterior of said plunger to said auxiliary valve chamber at one side of said auxiliary valve, to release the fluid pressure on said plunger surface of greater area, a by-pass port leading from the exterior of said plunger to said auxiliary valve chamber at the opposite side of said valve to restore said auxiliary valve to its seat, and means to force said auxiliary valve from its seat.

2. A flush valve comprising a casing having inlet and outlet openings, a valve seat interposed between said inlet and outlet openings, a plunger movable to and from said valve seat within said casing and constituting a valve to seat upon said valve seat, said plunger having a portion of its lower surface subject to fluid pressure and a greater area of its upper surface subject to fluid pressure to normally hold said plunger in engagement with its valve seat, a chamber within said plunger, communicating at its lower end with the space above said plunger and communicating at its upper end by means of a restricted by-pass with the space beneath said plunger, an auxiliary valve located in said chamber in position to engage a valve seat carried by said plunger to close a port leading from the lower portion of said plunger, and means to lift said auxiliary valve from its seat.

3. A flush valve comprising a casing having fluid supply and exit ports and an interposed valve seat, a plunger loosely fitting the interior of said casing and constituting a valve to engage said valve seat, said plunger having a portion of one surface and a relatively greater area of its opposite surface exposed to the fluid pressure within said casing to normally hold said plunger in engagement with its valve seat, and to cause said valve to automatically open when said fluid pressure is released from said greater pressure area, an auxiliary valve chamber within said plunger, an exit port with a valve seat through the wall of said chamber, an auxiliary plunger loosely fitting the interior of said auxiliary valve chamber and constituting a valve to engage said auxiliary valve seat, a port leading from the exterior of said plunger to said auxiliary valve chamber at one side of said auxiliary valve, to release the fluid pressure on said plunger surface of greater area, a by-pass port leading from the exterior of said plunger to said auxiliary valve chamber at the opposite side of said valve to restore said auxiliary valve to its seat, and means to force said auxiliary valve from its seat.

4. A flush valve comprising a casing having an annular valve seat and an annular fluid pressure chamber surrounding said valve seat, a plunger movable to and from said valve seat within said casing and constituting a valve to seat upon said valve seat, said plunger having a portion of its lower surface subject to fluid pressure and a greater area of its upper surface subject to fluid pressure to normally hold said plunger in engagement with its valve seat, a chamber within said plunger, communicating at its lower end with the space above said plunger and communicating at its upper end by means of a restricted by-pass with the space beneath said plunger, an auxiliary valve located in said chamber in position to engage a valve seat carried by said plunger to close a port leading from the lower portion of said plunger, and means to lift said auxiliary valve from its seat.

5. A flush valve comprising a casing having inlet and outlet openings, a valve seat interposed between said inlet and outlet openings, a plunger movable to and from said valve seat within said casing and constituting a valve to seat upon said valve seat, said plunger having a portion of its lower surface subject to fluid pressure and a greater area of its upper surface subject to fluid pressure to normally hold said plunger in engagement with its valve seat, an auxiliary valve chamber communicating at one of its ends with the space above said plunger and communicating at its other end by means of a restricted by-pass with the space beneath said plunger, an imperforate auxiliary plunger valve located in said auxiliary valve chamber in position to engage a valve seat to close a port which when open serves to permit the escape of fluid from the auxiliary valve chamber and the space above the first plunger, and means to lift said auxiliary plunger valve from its seat.

In witness whereof, I hereunto subscribe my name this 1st day of April, A. D. 1915.

JOSEPH G. PERKINS.

Witnesses:
E. H. MESCH,
F. E. BOSTEL.

Copies of this patent may be obtained for five cents each, by addressing the "Commissioner of Patents, Washington, D. C."